US010630085B2

(12) United States Patent
Gray

(10) Patent No.: US 10,630,085 B2
(45) Date of Patent: Apr. 21, 2020

(54) PORTABLE POWER SOLUTIONS

(71) Applicant: Oomf Inc., Cambridge, MA (US)

(72) Inventor: Gavin Gray, Cambridge, MA (US)

(73) Assignee: Omnicharge, Inc., Los Angeles, CA (US)

( * ) Notice: Subject to any disclaimer, the term of this patent is extended or adjusted under 35 U.S.C. 154(b) by 137 days.

(21) Appl. No.: 15/855,278

(22) Filed: Dec. 27, 2017

(65) Prior Publication Data

US 2018/0123361 A1    May 3, 2018

Related U.S. Application Data

(63) Continuation-in-part of application No. 15/614,737, filed on Jun. 6, 2017, and a continuation-in-part of application No. 15/614,756, filed on Jun. 6, 2017, now Pat. No. 10,349,269.

(60) Provisional application No. 62/439,419, filed on Dec. 27, 2016, provisional application No. 62/346,083, (Continued)

(51) Int. Cl.
| | |
|---|---|
| *H04L 29/06* | (2006.01) |
| *H02J 7/00* | (2006.01) |
| *H02J 7/02* | (2016.01) |
| *G06F 1/28* | (2006.01) |
| *H04W 12/08* | (2009.01) |
| *G06F 1/26* | (2006.01) |
| *G06F 1/16* | (2006.01) |

(52) U.S. Cl.
CPC .......... *H02J 7/0021* (2013.01); *G06F 1/1632* (2013.01); *G06F 1/263* (2013.01); *G06F 1/28* (2013.01); *H02J 7/0022* (2013.01); *H02J 7/0042* (2013.01); *H02J 7/025* (2013.01); *H04L 63/10* (2013.01); *H04W 12/08* (2013.01)

(58) Field of Classification Search
CPC ........ H02J 7/0021; H02J 7/0022; H02J 7/025; G06F 1/263; G06F 1/28; H04L 63/10; H04W 12/08
See application file for complete search history.

(56) References Cited

U.S. PATENT DOCUMENTS

| | | |
|---|---|---|
| 6,665,549 B1 | 12/2003 | Reed |
| 6,823,459 B1 | 11/2004 | Horikoshi et al. |
| 8,618,770 B2 | 12/2013 | Baarman |

(Continued)

FOREIGN PATENT DOCUMENTS

| | | |
|---|---|---|
| GB | 2528911 A | 10/2016 |
| WO | 2016020645 A1 | 2/2016 |

*Primary Examiner* — Hosuk Song
(74) *Attorney, Agent, or Firm* — Rhodes Donahoe, LLC; Robert V. Donahue

(57) ABSTRACT

The system includes a device activation module and a system monitoring module in resources accessible to the system operator over the wide area network. In one embodiment, the method operates to process collateral received by the resources from a client device possessed by a user interested in activating an AC output included in a charger selected by the user from the plurality of portable chargers. Further, if the collateral is accepted, an authorization is wirelessly communicated from the device activation module to the client device, a device activation signal wirelessly communicated from the client device following a receipt of the authorization is received by the charger selected by the user, and the AC output included in the charger selected by the user is activated following a receipt of the device activation signal.

20 Claims, 6 Drawing Sheets

Related U.S. Application Data filed on Jun. 6, 2016, provisional application No. 62/358,598, filed on Jul. 6, 2016.

(56) References Cited

U.S. PATENT DOCUMENTS

| | | |
|---|---|---|
| 8,917,057 B2 * | 12/2014 | Hui .................. H01F 38/14 |
| | | 320/108 |
| 9,071,606 B2 | 5/2015 | Braun et al. |
| 9,191,075 B2 * | 11/2015 | Jung .................. H02J 7/025 |
| 9,252,604 B2 * | 2/2016 | Kim .................. H02J 7/0024 |
| 9,356,473 B2 * | 5/2016 | Ghovanloo ............ H02J 5/005 |
| 9,461,501 B2 * | 10/2016 | Partovi ................ H02J 7/0027 |
| 9,509,168 B2 * | 11/2016 | Ye .................... H02J 7/025 |
| 9,537,994 B2 | 1/2017 | Baldasare et al. |
| 9,538,384 B2 | 1/2017 | Donnellan et al. |
| 9,557,889 B2 | 1/2017 | Raleigh et al. |
| 9,569,638 B2 | 2/2017 | Zatko et al. |
| 9,620,281 B2 * | 4/2017 | Covic .................. H01F 27/346 |
| 9,665,708 B2 | 5/2017 | Fanton et al. |
| 9,942,087 B2 | 4/2018 | Gunjal et al. |
| 10,008,889 B2 | 6/2018 | Bell et al. |
| 2007/0220575 A1 | 9/2007 | Cooper et al. |
| 2009/0181641 A1 | 7/2009 | Fiatal |
| 2011/0258467 A1 | 10/2011 | Antoci |
| 2012/0150670 A1 | 6/2012 | Taylor et al. |
| 2013/0088192 A1 | 4/2013 | Eaton |
| 2014/0232635 A1 | 8/2014 | Lee |
| 2014/0375261 A1 | 12/2014 | Manova-Elssibony et al. |
| 2015/0025935 A1 | 1/2015 | Hao et al. |
| 2016/0098770 A1 | 4/2016 | Chang et al. |
| 2016/0100312 A1 | 4/2016 | Bell et al. |
| 2017/0163645 A1 | 6/2017 | Bradley et al. |

* cited by examiner

PORTABLE POWER SOLUTIONS

RELATED APPLICATIONS

The application claims the benefit under 35 U.S.C. § 119(e) to U.S. Provisional Application Ser. No. 62/439,419, entitled "PORTABLE POWER SOLUTIONS," filed on Dec. 27, 2016. This application is also a continuation-in-part of each of U.S. application Ser. No. 15/614,737, entitled "APPARATUS, SYSTEM AND METHOD FOR SHARING TANGIBLE OBJECTS," filed Jun. 6, 2017, and U.S. application Ser. No. 15/614,756, entitled "APPARATUS, SYSTEM AND METHOD FOR DEVICE ACTIVATION," filed Jun. 6, 2017, each of which also claims benefit under 35 U.S.C. § 119(e) to U.S. Provisional Application Ser. No. 62/346,083, entitled "APPARATUS, SYSTEM AND METHOD FOR CONTROLLING AND MONITORING DEVICE CHARGERS," filed Jun. 6, 2016, U.S. Provisional Application Ser. No. 62/358,598, entitled "APPARATUS, SYSTEM AND METHOD FOR DEVICE ACTIVATION," filed Jul. 6, 2016, and U.S. Provisional Application Ser. No. 62/439,419. The disclosure of each of the preceding applications is herein incorporated by reference in its entirety.

BACKGROUND OF INVENTION

1. Field of Invention

This invention relates generally to systems, apparatus and methods for portable power solutions. More specifically, at least one embodiment, relates to systems, apparatus and methods that provide portable charging solutions suitable for recharging devices that employ AC charging circuitry.

2. Discussion of Related Art

Portable electronic devices such as laptops, tablet computers, smartphones and other portable end-user computing devices are commonplace at home, school and the office. These devices typically require an AC power source for recharging. The quantity of power outlets available in a residence is usually sufficient for connecting the variety of the end-user devices found there. However, other more densely populated facilities often lack the infrastructure required to support an AC power connection for the devices employed by the majority of occupants. Such facilities can include classrooms, co-working spaces, libraries, airports or other transportation hubs, coffee shops and restaurants.

In legacy facilities (for example, a university classroom built more than 15 or 20 years ago), retrofitting a single facility to add AC power outlets for the dense occupancy found in the facility can cost millions of dollars.

Some approaches employ portable power chargers provided via a kiosk, however, these approaches do not provide chargers that include AC output current. In addition, kiosks can take up a substantial amount of space at a facility. The space allocation for the kiosk must compete with existing infrastructure already in place. Other approaches employ a "lock-box" type solution that can temporarily leave the user without access to their portable electronic device during recharging. These approaches also do not provide any AC output. Thus, a user of a laptop computer typically must locate a wall outlet as a source of charging power. Of course, wall outlets are limited in number and only available in fixed locations.

Current portable charging solutions can include an integral battery with a hardwired connection for charging the charger, and one or more hardwired connections (for example, cables and/or ports) for the connection of the device to be charged. These chargers sometimes now include inductive charging options. Inductive charging employs an electromagnetic field to transfer energy from the charger to the device being charged through electromagnetic induction. An inductive coupling between coils included in the two devices operate to transfer energy (transmit/receive) used to charge batteries included in the portable device.

Some portable chargers can be stored on a charging station with the chargers stacked one upon another. Such an approach can create challenges in configuring chargers that accurately sense when they are stacked on an adjacent charger and/or have an adjacent charger stacked on them. The preceding requires a more sophisticated "charging logic" than included in some portable chargers. The addition of inductive charging further increases the complexity and has yet to be addressed for stackable, portable chargers.

SUMMARY OF INVENTION

Therefore, there is a need for systems, apparatus and methods that provide portable charging solutions for facilities that require additional AC power outlets to meet the demand of the occupants of the facility. Embodiments described herein provide systems for monitoring and management of portable power chargers that provide AC power charging at nominal voltage and power levels required for all of today's most popular hand held electronic devices. For example, a 120 VAC, 75 Watt power supply is required to charge today's MacBook Pro. Approaches described herein provide cloud-based resources that allow a system operator to seamlessly deploy chargers that meet the preceding requirement. In various embodiments, the system operator can monitor and management the deployed-chargers remotely using the cloud-based resources as described herein.

Further, there is a need for systems, apparatus and methods that provide portable, stackable chargers including an inductive charging feature. Some embodiments described herein provide portable, stackable chargers with an AC output capable of charging a laptop. In further embodiments, these chargers include inductive charging capabilities. In still further embodiments, the portable, stackable chargers include circuitry that easily allows the chargers to complete an electrical connection with chargers that are immediately adjacent to them when stacked one upon another.

In one aspect, a system for remote monitoring and management of chargers provides an AC output in a portable, hand-held form factor where the monitoring and management functionality is accessible to a system operator over a wide area network. According to some embodiments, the system includes a plurality of portable chargers each having an internal battery, a first charging output coupled to the internal battery and configured to provide AC charging power and at least one additional charging output coupled to the internal battery, the at least one additional charging output selected from a group consisting of: an inductive charger and a plug-in DC charger. The system also includes an enclosure coupled to a source of AC power suitable for recharging the plurality of portable chargers, the enclosure including a plurality of bays each configured to receive one of the plurality of portable chargers, respectively, each of the plurality of bays including an electrical connection configured to couple to the internal battery of the respective portable charger to provide power to recharge the internal battery; and resources accessible to the system operator over the wide area network to allow the system operator to monitor and manage an operation of the plurality of portable chargers. According to one embodiment, the resources include a device activation module configured to permit users to activate a charger selected from the plurality of portable chargers following a receipt of collateral provided by the user via a client device, the device activation resulting in charging power being made available at each of the first charging output and the at least one additional charging output; and a system monitoring module configured to provide the system operator with information concerning an operational status of each of the plurality of portable chargers, the operational status including information selected from a group consisting of: usage statistics, a projected life of the internal battery, and a current charge status of the internal battery.

According to one embodiment, the client device is a first wireless communication device configured to wirelessly couple to the resources and the system further includes a second wireless communication device configured to wirelessly couple to the plurality of portable chargers. In one version, the second wireless communication device is configured to wirelessly communicate the information concerning the operational status to the system monitoring module.

According to a further embodiment, the device activation module is configured to communicate a device activation signal to client device, and the charger selected from the plurality of chargers is configured to provide power at the first charging output and at the at least one additional charging output when the device activation signal is received from the client device. In a still further embodiment, the device activation module is configured to maintain the charger selected from the plurality of chargers in an off-state pending an acceptance of the collateral provided by the user.

According to still another embodiment, the device activation module is configurable by the system operator to accept collateral of a pre-determined type selected by the system operator. According to a further embodiment, the pre-determined type of collateral is selected from a group consisting of: a monetary payment; an interaction by the user with content hosted on the resources and delivered to the client device; an authenticated identity of the user; and payment-account information of the user. Depending on the embodiment, the pre-determined collateral can include any one of the preceding, any combination of the preceding, other forms of collateral that can be evaluated using the cloud-based resources or any combination of the preceding and one or more of the other forms of collateral.

According to yet another embodiment, the resources include a user management module configured to allow each of a plurality of users to establish an account to uniquely identity the user, respectively, and the user management module is accessible to the system operator to establish one or more permissions for each of the plurality of users, the permissions established by the system operator based on conditions selected from a group consisting of: acceptance of a user identity; an identification of a geographic location of the plurality of portable chargers accessible to the respective user; and a venue accessible to the respective user.

According to various embodiments, the first charging output is configured to provide 120 VAC charging power rated at 75 Watts or greater.

According to another aspect, a method of remotely monitoring and managing, over a wide area network, an operation and deployment of a plurality of portable chargers each providing an AC output in a hand-held form factor by a system operator is provided. According to some embodiments, the system includes a device activation module and a system monitoring module in resources accessible to the system operator over the wide area network. In one embodiment, the method operates to process collateral received by the resources from a client device possessed by a user interested in activating an AC output included in a charger selected by the user from the plurality of portable chargers. Further, if the collateral is accepted, an authorization is wirelessly communicated from the device activation module to the client device, a device activation signal wirelessly communicated from the client device following a receipt of the authorization is received by the charger selected by the user, and the AC output included in the charger selected by the user is activated following a receipt of the device activation signal.

According to one embodiment, the method includes coupling each of the plurality of portable chargers to a wireless communication device when the plurality of chargers are deployed, and receiving, by the system monitoring module, information communicated wirelessly from the wireless communication device the information concerning an operational status of each of the plurality of portable chargers, the operational status including information selected from a group consisting of: usage statistics, a projected life of the internal battery, and a current charge status of the internal battery.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
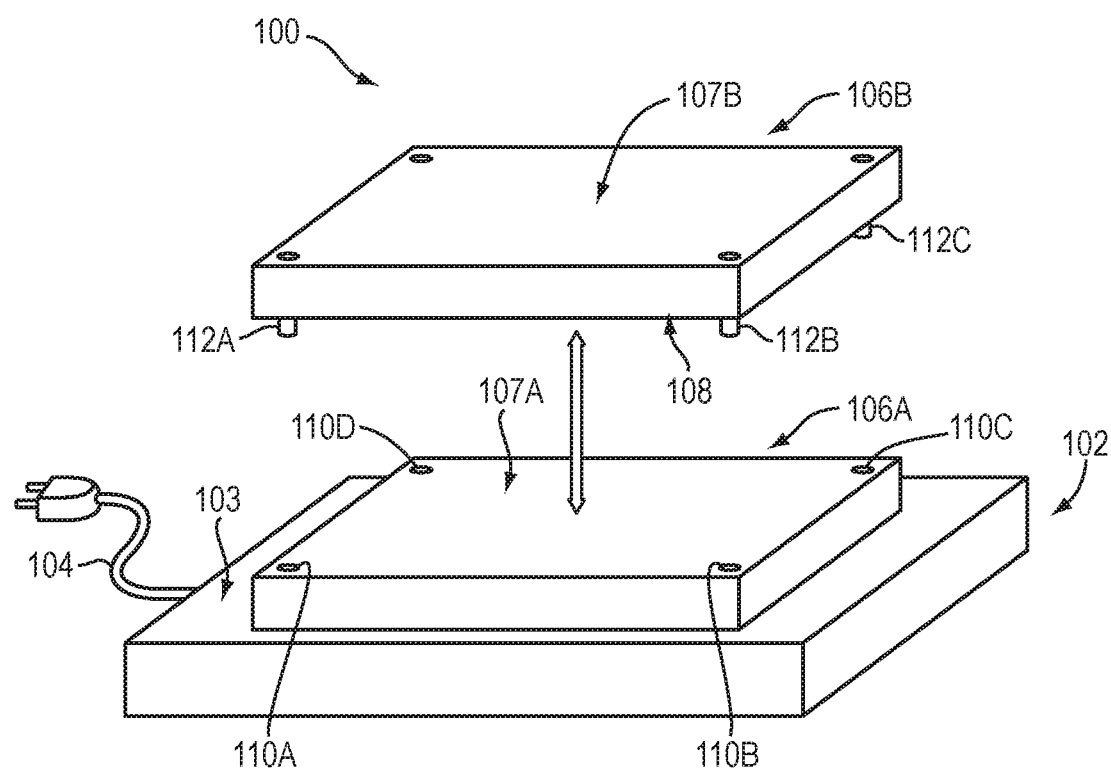
FIG. 1 illustrates a charging system in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 illustrates a charging system 100 in an embodiment that includes a base station 102, a power cord 104, a first portable charger 106A and a second portable charger 106B. The power cord 104 connects the base station 102 to a power source, for example, via plugging the power cord 104 into an AC power outlet. The base station 102 includes a housing having a top surface 103. Each portable charger 106A, 106B includes a housing having a top surface 107, and a bottom surface 108. In the illustrated embodiment, the bottom surface of the first portable charger 106A is not identified because it rests on the top surface 103 of the base station 102.

The top surface 107A of the first portable charger 106A includes a first set of electrical connections 110. In the illustrated embodiment, the first set of electrical connections 110 includes a connection in each corner of the charger 106A, for example, the first set of electrical connections 110A, 110B, 110C and 110D. A similar set of electrical connections 110 is included at the top surface 107B of the second portable charger 106B.

The bottom surface 108 of the second portable charger 106B includes a second set of electrical connections 112. In the illustrated embodiment, the second set of electrical connections 112 includes a connection in each corner of the charger 106B. As illustrated, the second set of electrical connections 112 includes electrical connections 112A, 112B and 112C. According to one embodiment, a fourth electrical connection is included at the rear corner on the bottom surface 108 of the second portable charger 106B. A similar set of electrical connections 112 is included at the bottom surface of the first portable charger 106A.

Depending upon the embodiment, the quantity and configuration of the electrical connections can vary. In general, the polarity of the connections should be matched for proper operation. For example, where the electrical connections 110, 112 are employed in a DC power circuit, a positive pole included in the electrical connections on a first portable charge should be connected to a positive pole on a second portable charger. Similar, with the two portable chargers docked on upon the other, a connection of the negative poles of the respective portable chargers should be completed. Where the housing provides the portable chargers with an overall symmetrical shape, portable chargers may be stacked one upon another with the chargers in more than one rotational position relative to one another. For example, the chargers can be rotated about a vertical axis centrally located relative to the stack of chargers. The preceding can also occur for non-symmetrically shaped housings. For example, a housing having an overall rectangular shape can be docked (or nested together) in two positions separated from one another by 180° of rotation. Approaches described herein provide error-free approaches to maintain the correct connection between the poles of the circuitry that connects one charger to the next.

Each of the first set of electrical connections 110 and the second set of electrical connections 112 include a contact surface, respectively. In addition, the first set of electrical connections 110 can include structure, for example, a size and/or shape, to align and engage with the second set of electrical connections 112 when adjacent portable chargers are stacked one upon another. According to one embodiment, the first set of electrical connections 110 are provided in a "female" configuration and the second set of electrical connections 112 are provided in a "male" configuration. According to one embodiment, the shape of the top surface 107 of the portable charging station is configured to facilitate an alignment of the electrical connections. For example, each of the first set of electrical connections 110 can be included in a recess, respectively, on the top surface 107. Similarly, each of the second set of electrical connections 112 can be included on a projection, respectively, on the bottom surface 108.

According to various embodiments, the base station 102 includes circuitry employed to convert AC power supplied to the base station 102 to DC power suitable for charging a plurality of portable chargers connected to the base station 102. Depending on the embodiment, the base station 102 can employ physical contacts to connect to compatible physical connections included on an underside of the portable charger 106A, for example, second electrical connections 112 located on the underside of the portable charger 106A. In other embodiments, the base station 102 can employ inductive charging such that a wireless power charging connection is completed between the base station 102 and the portable charger 106A with the charger 106A placed on the top surface 103 of the base station 102. In still another embodiment, the system 100 includes the base station 102 and the portable chargers 106, respectively, each incorporating both physical contacts for a direct connection in charging circuitry and inductive charging circuitry for wireless power transfer.

In operation, the base station 102 is connected to a source of AC power. Typically, the AC power is converted to DC power suitable for use in charging the connected portable charger(s) 106 by a direct electrical connection. Where the base station 102 includes inductive charging (alternatively or in addition to the preceding), the DC power is converted to high frequency AC power for wireless transmission to a receiving coil in the portable charger 106.

The first portable charger 106A is placed on the top surface 103 of the base station 102. The second portable charger 106B is placed on the top surface 107A of the first portable charger 106A. In various embodiments, additional portable chargers can be placed one upon another to increase the height of the stack of portable chargers 106 located on the base station 102. According to various embodiments, charging power is transferred from the base station to the uppermost portable charger 106B located on the stack via any portable charger located between the base station and the uppermost portable charger on the stack. For example, according to one embodiment, charging power is transferred from the base station 102 to the second portable charger 106B via the first portable charger 106A in the system 100 illustrated in FIG. 1. Thus, the maximum current carrying capacity provided to conduct power from the second set of electrical contacts 112 to the first set of electrical contacts 110 can limit the number of portable chargers 106 that can be included in any one stack.

Figure 2:
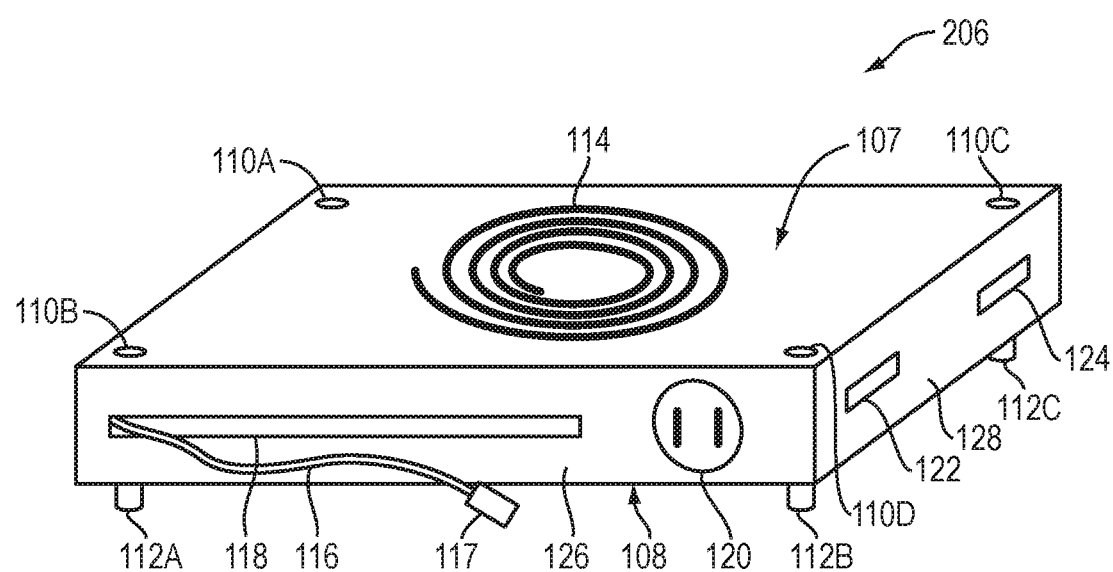
FIG. 2 illustrates a portable charger in accordance with one embodiment.

Referring now to FIG. 2, a portable charger 206 is illustrated in accordance with one embodiment. According to the illustrated embodiment, the portable charger 206 includes a housing having an upper surface 107, a bottom surface 108 and a storage recess 118. The portable charger 206 also includes the first set of electrical contacts 110, the second set of electrical contacts 112, an inductive-power transmitter 114, a charging cable 116, a power outlet 120, a first power port 122 and a second power port 124.

In the illustrated embodiment, the portable charger 206 is configured to have a square, rectangular or otherwise parallelogram-shape. The charger 206 includes a first side wall 126 and a second side wall 128. The storage recess 118 is located in the first side wall and is configured to store the charging cable 116 within the housing while leaving the cable 116 easily accessible for use when needed. In various embodiments, the portable charger can include a plurality of charging cables to provide connections for a variety of types of connectors. In still other embodiments, the portable charger 206 only provides plug-in receptacle connections and cables are not included. According to the illustrated embodiment, the power outlet 120 is also located in the first side wall for a direct connection of external devices to a source of power included in the portable charger 206. In some embodiments, the source of power available at the outlet 120 is a high-current AC power, for example, high-current power provided at 120 VAC. Each of the first power port 122 and the second power port 124 are located in the second side wall. According to various embodiments, the first power port 122 and the second power port 124 are configured as USB ports. In a further embodiment, the first power port 122 is a conventional USB port rated at 5 VDC up to 3 Amps while the second power port 124 includes a "quickcharge" feature, for example, Qualcomm® Quick Charge® technology.

Depending on the embodiment, the housing can be provided in other shapes. For example, in an alternate embodiment the portable charger 206 is provided in a disk-shape. In various embodiments, the housing of the portable power charger 206 can be manufactured from plastic, for example, ABS or metal such as aluminum or steel.

In various embodiments, the portable charger 206 provides multiple types of connections for use with a variety of portable electronic devices. For example, the charging cable 116 can include a connector 117 suitable for use with electrical connectors included in Apple devices, for example, the Apple Lighting connector, the Apple 30-pin connector, etc. The charging cable can also include non-proprietary connectors 117, for example, mini-USB, micro-USB, USB-A, USB-B and USB-C connectors or other styles and types of connectors in a male configuration. Similarly, the first port 122 and the second port 124 can include the same or different types of connectors, for example, in a female configuration. Examples include mini-USB, micro-USB, USB-A, USB-B and USB-C. The preceding examples are non-limiting as the connectors can be configured for the hardwired connections that support power transfer to a selected set of portable electronic devices. Depending on the embodiment, the power output of the portable charger 206 is provided in a DC voltage suitable for connection to the portable electronic device to be charged. For example, where the portable device is an iPhone or iPad the DC output can be provided at a nominal 5 VDC. Higher output voltages can be provided (for example, 12 VDC) depending on the embodiment.

The availability of AC power outputs is advantageous for charging portable electronic devices because AC power conversion/transfer is more ubiquitous across a multitude of battery-powered devices such as mobile phones and laptop computers as two examples. According to various embodiments, the power outlet 120 includes a type A plug socket or a type B plug socket rated 120 VAC/150 VDC, typically employed in North America. In other embodiments, the power outlet 120 includes a type C plug socket, a type F plug socket (typically employed in Europe) or the type A socket rated 230 VAC/300 VDC. Thus, the portable charger 206 can deliver AC power at 50 W or more. In some embodiments, the charger 206 includes a hi-power DC output source. According to further embodiments, the portable charger 206 includes at least two power outlets 120 where a first power outlet provides AC power and a second power outlet provides hi-power DC power. In still another embodiment, multiple AC power outlets and/or multiple DC power outlets can be included in the portable charger 206.

The above-described AC version of the power outlet 120 is well matched to the needs of today's device-owners. For example, the portable charger 120 can be provided to students using laptop computers where a college classroom lacks outlets distributed throughout the classroom. A system 100 including a plurality of chargers can be provided at or near an entrance to the classroom to allow students to carry a source of 120 VAC charging power to their seat to operate their laptop. The 120 VAC configuration may also allow the students to charge any of the mobile devices in their possession. The stackable configuration illustrated in FIG. 1 facilitates the preceding in a manner that occupies a minimum amount of space. In addition, the base station 102 is the only element included in the system 100 that requires a power outlet.

In systems 100 where inductive power transfer is employed, the portable power chargers 206 include the inductive-power transmitter 114 located at the top surface 107, and an inductive-power receiver (not illustrated) located at the bottom surface 108. In practice, the inductive-power transmitters and receivers are located at or just below the associated top surface 107 and bottom surface 108, respectively. According to various embodiments, the maximum distance that the coil is located beneath the surface is provided to maintain an inductive coupling between adjacent devices when a first device is placed on a second device (portable chargers and/or portable electronic devices). In one embodiment, the maximum distance is 5 mm. In various embodiments, the transmitter includes a coil employed to generate and wirelessly transmit a high frequency AC power signal. The receiver includes a coil to receive the high frequency AC power signal and communicate the power to circuitry included in the portable power charger for conversion to DC. According to some embodiments, the transmitting and receiving coils are provided as a planar power coil, respectively. Where the portable power chargers 206 include inductive power circuitry the housing can be manufactured from plastic or other non-conductive material that will not interfere with the wireless power transfer.

According to various embodiments, the inductive system included in the portable charger 206 employs the Qi standard. According to these embodiments, the inductive system transfers energy between devices at or below 15 W.

Figure 3:
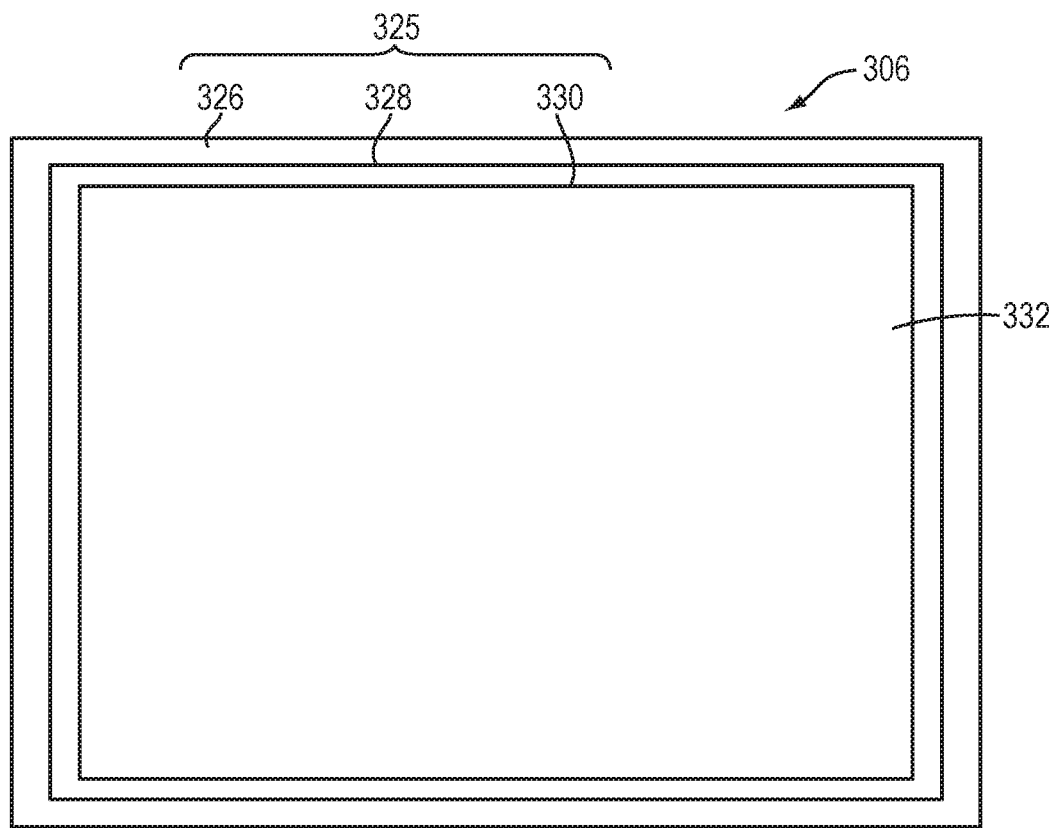
FIG. 3 illustrates a bottom view of a portable charger in accordance with a further embodiment.
Figure 4:
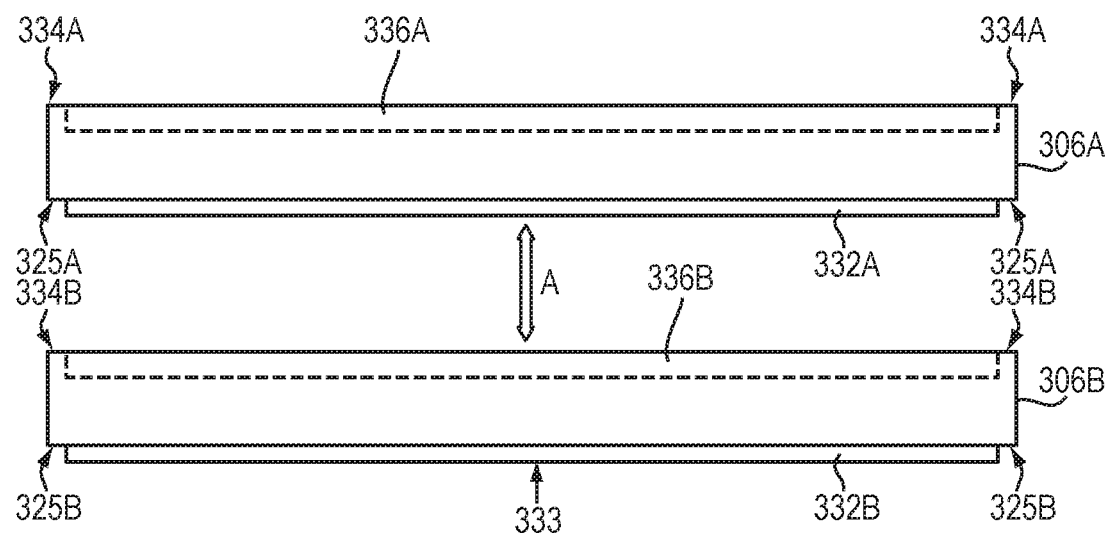
FIG. 4 illustrates a plan view of the portable charger illustrated in FIG. 3 in accordance with one embodiment.

Referring now to FIGS. 3 and 4, a portable charger 306 is illustrated in an embodiment in which chargers as described with reference to FIG. 2 can be configured in a stackable array for recharging when docked on a base station. FIG. 3 illustrates the underside of the portable charger 306 including a lower electrical contact region 325, a first conductive region 326, an insulator 328 and a second conductive region 330. The portable charger 306 also includes a base 332 that forms a bottom surface 333 (see FIG. 4). FIG. 4 illustrates a plan view of a first portable charger 306A and a second portable charger 306B in accordance with one embodiment. As illustrated, the first portable charger 306A is partially removed from the stack of chargers with an arrow A representing a direction of removal (upward) or reconnection (downward) relative to the lowermost charger, the second portable charger 306B.

The portable charger 306 also includes an upper electrical contact region 334 and a recess 336. The recess 336 is formed in the top side of the portable charger 306 and the upper electrical contact region 334 forms a rim around an outer edge of the recess 336. According to the illustrated embodiment, the upper electrical contact region 334 includes three elements similar to those described with reference to the lower electrical contact region 325. For example, a radially outward portion of the upper electrical contact region 334 includes a first conductive region and a radially inward portion of the upper electrical contact region 334 includes a second conductive region. In one embodiment, an insulator is located between the first and second conductive regions included in the upper electrical contact region in a manner similar to the insulator 328 included in the lower electrical contact region. A base station (for example, the base station 102) for use with a portable docking station (for example, the portable docking station 306) can include structure corresponding to the upper electrical contact surface 334 and the recess 336 included in the portable docking station 306.

According to one embodiment, the first conductive region 326 and the second conductive region 330 provide access to a DC power circuit located in the portable charger 306. For example, the first and second conductive regions 326, 330, respectively, provide access to one of a positive and a negative DC pole included in charging and/or power transmission circuit. Corresponding conductive regions located in the upper electrical contact region 334 are configured to provide a suitable match with the lower electrical contact region. For example, where the first conductive region 326 provides access to a positive DC pole and the second conductive region 330 provides access to a negative DC pole, the corresponding conductive regions included in the upper electrical contact 334 are configured to match. As a result, the contact region for the positive pole of each electrical contact region 325, 334 are placed in contact with one another when the first portable charger 306A is stacked on the second portable charger 306B. Similarly, the contact region for the negative pole of each electrical contact region 325, 334 are placed in contact with one another with the first portable charger 306A stacked on the second portable charger 306B.

The location, size and shape of the lower electrical contact region 325, the upper electrical contact region 334, the base 332 and the recess 336 provide for a user-friendly alignment that can be easily completed with the correct electrical polarity. For example, with the second portable charger 306B located on the base station, the base 332 of first portable charger 306A is located within the recess 336B included in the second portable charger 306B. With the first portable charger 306A resting on top of the second portable charger 306A, the lower electrical contact region 325A of the first charger 306A is placed in contact with the upper electrical contact region 334B of the second charger 306B while maintaining the correct polarity as described above.

According to an alternate embodiment, the mechanical design features illustrated in FIGS. 3 and 4 are provided simply as an alignment mechanism. According to these embodiments, the portable chargers 306A and 306B include the lower region 325, the base 332, the upper region 334 and the recess 336 but omit the electrical contacts in each of the lower region 325 and the upper region 334. In the absence of conductive material in these regions, the structure provides a user-friendly alignment mechanism. In these embodiments, another style of contact is employed to complete an electrical connection to the portable charger, for example, the first set of electrical connections 110 and the second set of electrical connections 112.

In addition to the ease of docking/stacking portable charging stations, embodiments of the portable chargers 306 illustrated in FIGS. 3 and 4 are also advantageous because they provide an error-proof means of correctly connecting the DC power circuitry of adjacent chargers to one another. A system that employs a base and a stacked configuration for simultaneously recharging multiple portable chargers requires that the polarity of the connected chargers is correct throughout the stack. The rectangular shape of the embodiments illustrated herein while not symmetrical creates the same challenge because the chargers can be stacked in more than one configuration in which the mechanical connection is mechanically "correct." For example, the chargers illustrated herein can be rotated 180 degrees and still nest with one another. The configuration of the upper and lower electrical contact surfaces located 360 degrees about the circumference of the chargers provide a fail-safe electrical interface that always connects to the adjacent chargers with the correct DC polarity when the portable chargers are stacked together in either of the two rotational positions in which the portable chargers nest together. Thus, the shape and location of the electrical contact regions 325, 334 provides a fail-safe connection in the correct polarity while avoiding the need to employ detents or other mechanical structure to orient the chargers with the correct connections.

The preceding allows for a power transfer from a base station to a first portable charger located lowermost in a stack of portable chargers, for example, the first portable charger 106A illustrated in FIG. 1. Power can be transferred up the stack via engagement of the upper contact region 334 with the lower contact region 325 of the second portable charger 106B. Power can be transferred to one or more portable chargers further up the stack in a similar manner.

Figure 5:
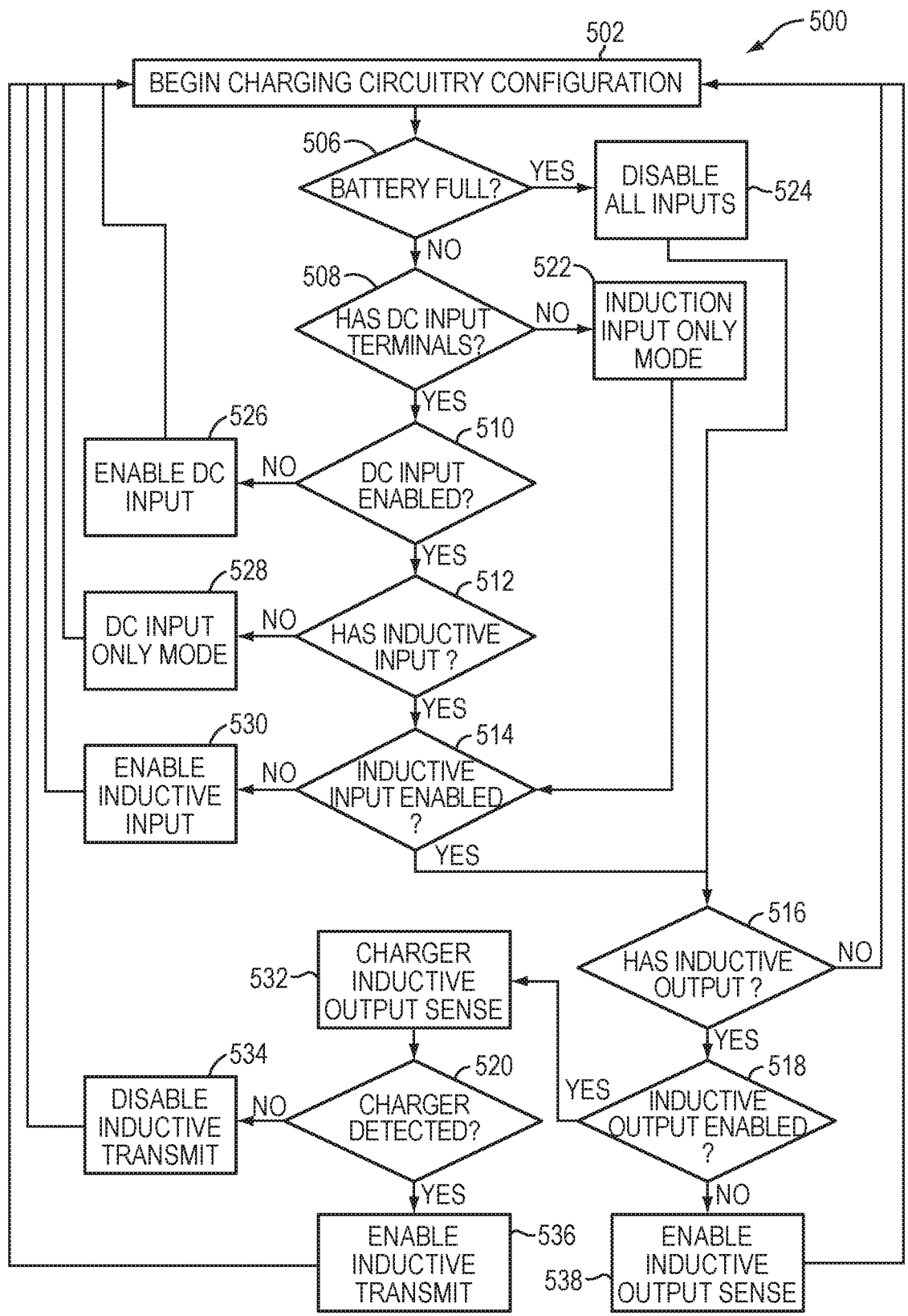
FIG. 5 illustrates a process concerning configuration and operation of a portable charger in accordance with one embodiment.

Referring now to FIG. 5, a process 500 for configuration and operation of portable chargers 106, 206 and 306 is illustrated in accordance with various embodiments. In general, the process 500 is employed with a portable charger that includes a combination of one or more of DC input terminals, an inductive input and an inductive output. The DC input terminals and the inductive input can be used to charge the portable charger when it is located at the base station 102. Further, the process 500 is suitable for use with a portable charger located directly on the base station 102 (for example, the first portable charger 106A) or a portable charger stacked on one or more chargers located beneath it (for example, the second portable charger 106B). The process 500 can also be employed with portable chargers that include one or more hardwired outputs used to charge portable electronic devices. Depending on the embodiment, the outputs can include DC outputs and/or AC outputs including high-current power provided at 120 VAC.

The process 500 includes a series of acts including decision points and activities. The decision points include an act 506 to determine whether the battery included in the portable charger is fully charged, an act 508 to determine whether the portable charger includes DC input terminals, an act 510 to determine whether the DC input terminals, if included, are enabled, an act 512 to determine whether the portable charger includes an inductive input, an act 514 to determine whether the inductive input, if included, is enabled, an act 516 to determine whether the portable charger includes an inductive output, an act 518 to determine whether the inductive output, if included, is enabled and an act 520 to determine whether the portable charger detects another portable charger adjacent to it.

As explained in detail below, the illustrated embodiment includes the following activities in the process 500: an act 522 to place the portable charger in an induction input only, an act 524 to disable all inputs, an act 526 to enable the DC input, an act 528 to place the portable charger in a DC input only mode, an act 530 to enable the inductive input, an act 532 to activate the portable charger inductive output sensing, an act 534 to disable the inductive power transmission from the portable charger and an act 536 to enable inductive power transmission.

According to the illustrated embodiment, the process 500 starts at act 502 where the charging circuitry configuration begins. At act 506 a determination is made concerning whether the battery included in the portable charger is fully charged. If the battery is not fully charged, the process 500 moves to act 508 where a determination is made whether the portable charger includes DC input terminals. If the portable charger includes DC input terminals, the process 500 moves to act 510 to determine whether the DC input terminals are enabled. If the DC input terminals are enabled, the process 500 moves to act 512 to determine whether the portable charger includes an inductive input. If the portable charger includes an inductive input, the process 500 moves to act 514 to determine whether the inductive input is enabled.

At this point in the process 500, the input hardware configuration of the portable charger is known, for example, whether the portable charger includes DC input terminals and/or inductive inputs that can be employed to charge the internal battery, whether the input hardware is in an active state and also the charge-status of the battery located in the portable charger. In addition, however, the process 500 is employed to configure the operating state of the inputs. If at act 506 it is determined that the battery in the portable charger is fully charged the process moves to act 524 because active inputs are unnecessary given the fully charged status of the battery.

If at act 508 a determination is made that DC input terminals are not included in the portable charger, the process 500 moves to act 522 where the portable charger is placed in an induction input only mode. The process 500 then continues to act 514 to determine whether the inductive input is enabled. If at act 514 it is determined that the inductive input is not enabled, the process 500 moves to act 530 where the inductive input is enabled. The process then returns to act 502. If at act 514 it is determined that the inductive input is already enabled, the process 500 moves to act 516 which is described further below.

If at act 510 it is determined that the DC input is not enabled, the process 500 moves to act 526 where the DC input included in the charger is enabled and the process returns to act 502. As described above, if at act 510 it is determined that the DC input is already enabled, the process 500 moves to act 512. If at act 512 a determination is made that the portable charger does not include an inductive input the process moves to act 528 where the charger is placed in a DC input only mode. The process then returns to act 502. If at act 512 a determination is made that the portable charger includes an inductive input, the process 500 moves to act 514. If at act 514 it is determined that the inductive input is not enabled, the process 500 moves to act 530 where the inductive input is enabled. The process then returns to act 502.

If at act 514 it is determined that the inductive input is enabled, the process 500 moves to act 516 to determine whether the portable charger also includes an inductive output. The process 500 returns to act 502 if it is determined that the charger does not include an inductive output. If at act 516 a determination is made that the portable charger includes an inductive output, the process 500 moves to act 518 to determine whether the inductive output is enabled. If at act 518 it is determined that the inductive input is not enabled, the process 500 moves to act 538 where the inductive output sensing circuitry is enabled. The process then returns to act 502. If at act 518 it is determined that the inductive input is enabled, the process 500 moves to act 532 where the portable charger's inductive output sensing is activated. The inductive output sensing circuitry enables the portable charger to detect the presence of a second portable charger located adjacent the first portable charger such that an inductive coupling can be established to allow the second charger to receive charging power from the first charger via the inductive output.

Following act 532 the process 500 moves to the act 520 to determine whether an adjacent portable charger is detected. If an adjacent portable charger is not detected, the process 500 moves to act 534 where the inductive transmit feature included in the portable charger is disabled. Alternatively, if an adjacent portable charger is detected, the process 500 moves to act 536 where the inductive transmit feature is enabled. The process 500 moves to the act 502 following either of the acts 534 and 536.

In various embodiments, the portable chargers employing the process 500 can also determine whether the charger is located on the base station. For example, in embodiments in which the charger includes DC input terminals, the circuitry included in the portable charger detects DC voltage on the stack through direct connection. In embodiments in which wireless charging is employed, the wireless receiver on the charger senses the wireless transmission from the station (or from a charger that is located directly below it).

Figure 6:
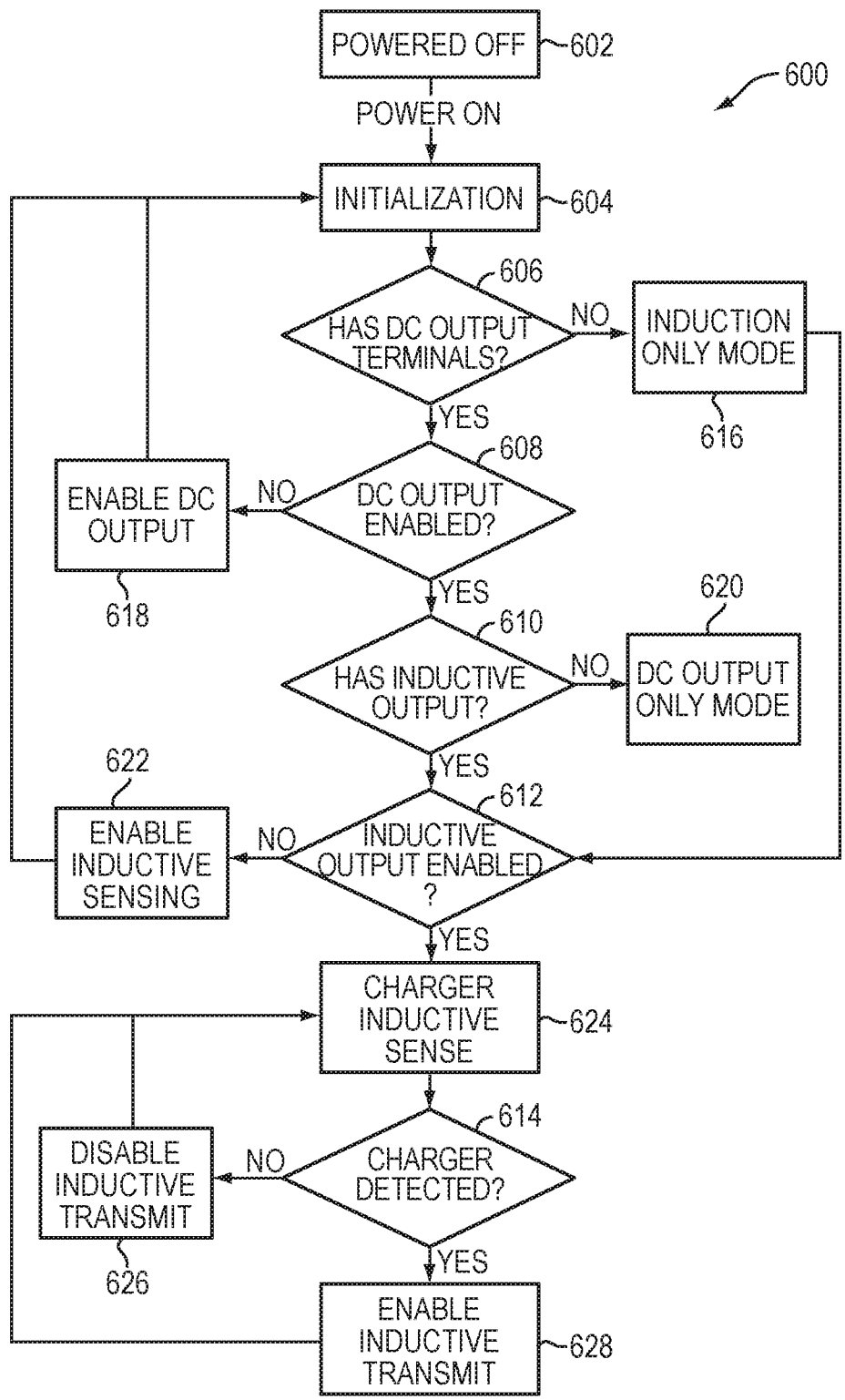
FIG. 6 illustrates a process concerning configuration and operation of a base station in accordance with one embodiment.

Referring now to FIG. 6, a process 600 for configuration and operation of a base station 102 is illustrated in accordance with various embodiments. In general, the process 600 is employed with a base station that includes a combination of one or more of DC output terminals and an inductive output depending on the embodiment. The process 600 includes a series of acts including decision points and activities. The decision points can include an act 606 to determine whether the base station includes DC output terminals; an act 608 to determine whether the DC output terminals, if included, are enabled, an act 610 to determine whether the base station includes an inductive output, an act 612 to determine whether the inductive output, if included, is enabled, and an act 614 to determine whether a portable charge is located on the base station.

As explained in detail below, the illustrated embodiment includes the following activities in the process 600: an act 602 in which the base station is in a powered off state, an act 604 to initialize the base station for the charging operation, an act 616 to place the base station in an induction output only mode, an act 618 to enable the DC output for charging, an act 620 to place the base station in a DC output only mode, an act 622 to enable inductive sensing, an act 624 to operate the base station in the inductive sensing mode, an act 626 to disable the inductive power transmission feature, and an act 628 to enable the inductive power transmission feature.

According to the illustrated embodiment, the process 600 starts at act 602 with the base station in a powered off state. An initialization of the base station for operation begins at act 604 when the base station is powered on. The process 600 moves to the act 606 and determines whether the base station includes DC output terminals. If it is determined that the base station includes DC output terminals, the process moves to the act 608 to determine whether the DC output is enabled. If the DC output terminals are enabled, the process 600 moves to act 610 to determine whether the base station also includes an inductive charging output. If the base station includes an inductive output, the process 600 moves to act 612 to determine whether the inductive output is enabled.

At this point in the process 600, the output configuration of the base station is known, for example, whether the base station includes DC output terminals and/or an inductive output. The process 600 is also employed to configure the operating state of the outputs. As mentioned above, the process 600 moves from act 600 to act 616 if the base station does not include DC output terminals. Where the base station is placed in the inductive charging only mode at act 616, the process 600 moves to act 612 to determine whether the inductive output is enabled. Further, if at act 610 the base station is found not to include an inductive output, the process moves to act 620 where the base station is placed in DC output only mode.

With the configuration of the base station determined, the process 600 operates to activate the outputs included in the base station. For example, if at act 608 the DC output included in the base station is not enabled, the process 600 moves to act 618 to enable the DC output. The process 600 then moves to act 604 and initialization. Similarly, if at act 612 the inductive output included in the base station is not enabled, the process 600 moves to act 622 to enable inductive sensing. With inductive sensing enabled the base station detects when a portable charger is physically located such that the charger can be inductively charged via the base station. The process then moves to act 604 and initialization.

With the outputs included in the base station enabled (and provided that the base station is not operating in DC output only mode), the process moves from act 612 to act 624 to operate the inductive sensing included in the base station. With inductive sensing operational, the process 600 moves to act 614 to determine whether a portable charger is located adjacent (for example, placed on) the base station such that an inductive coupling can be established to charge the portable charger via the base station. If an adjacent portable charger is not detected, the process moves to act 626 and the inductive power transmission is disabled. If an adjacent portable charger is detected, the process 600 moves to act 628 where the inductive power transmission feature is enabled.

The examples provided by the embodiments illustrated in FIGS. 5 and 6 are non-limiting because the same and/or other acts can be employed in various combinations depending on the embodiment. For example, different sequences of the illustrated acts can be provided. In still further embodiments, one or more of the illustrated acts can be replaced and/or removed from the process.

Figure 7:
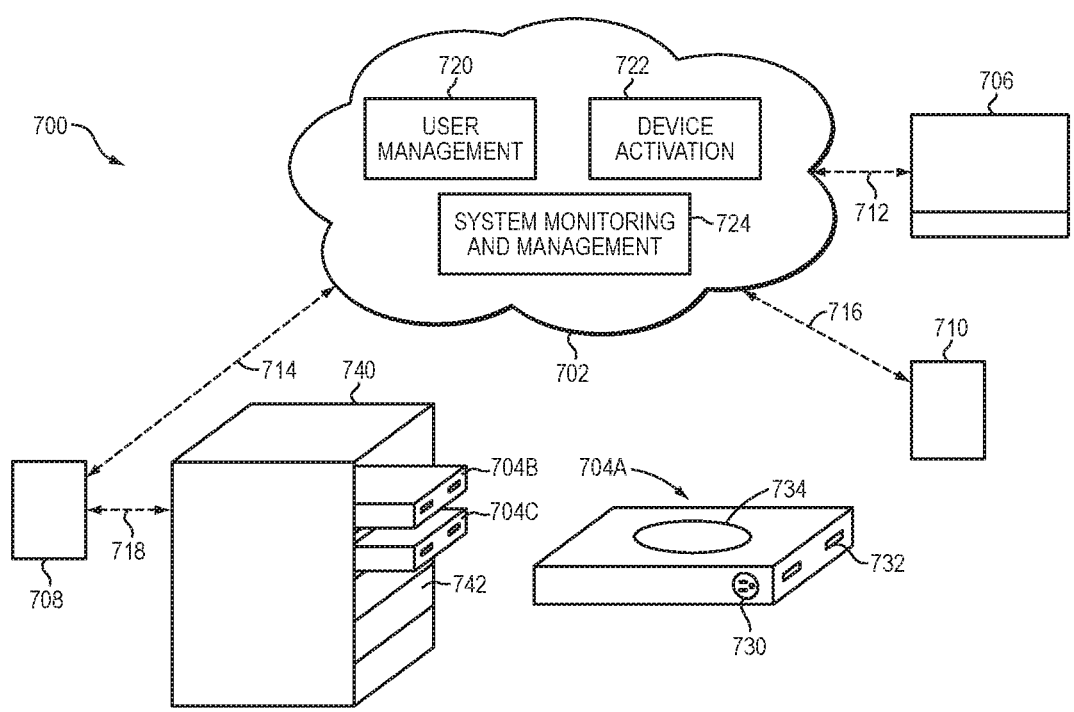
FIG. 7 illustrates a system including a network operating environment for monitoring portable power chargers in accordance with one embodiment.

Referring now to FIG. 7, a system 700 including a network operating environment for monitoring and management of portable power chargers is illustrated in accordance with one embodiment. Access to various portions of the system 700 via the network is available to a plurality of different entities. In various embodiments, the system 700 is utilized by one or more companies that deploy portable power chargers (i.e., system operator(s)), a provider of a managed cloud service (i.e., a system administrator) and a plurality of end users.

According to one embodiment, the system operator and the system administrator are the same entity. According to an alternate embodiment, the system administrator is a third party that integrates the cloud-based resources into the portable power charging system as a service to one or more the system administrators. For example, system operators can include separate university systems and the system administrator provides each university system with their own set of portable power chargers that each university manages and monitors independent of the other universities. Thus, the cloud-based resources illustrated and described with reference to FIG. 7 can be securely employed by a plurality of distinct entities. The preceding and other aspects and embodiments are described in co-owned U.S. Ser. No. 15/614,737, filed Jun. 6, 2017 and entitled "Apparatus, System and Method for Sharing Tangible Objects" which is incorporated by reference herein in its entirety According to the illustrated embodiment, the system 700 includes cloud-based resources 702, a plurality of portable power chargers 704A, 704B, 704C, an access device 706, a monitoring device 708 and a client device 710. The system 700 also includes a plurality of communication networks including a first communication network 712, a second communication network 714, a third communication network 716 and a fourth communication network 718.

In the illustrated embodiment, the cloud-based resources 702 include a user management module 720, a device activation module 722 and a system monitoring and management module 724. The cloud-based resources 702 can include additional features and functionality in various embodiments, for example, features as shown and described as shown with reference to FIG. 4 of co-owned U.S. application Ser. No. 15/614,737. According to one embodiment, the cloud-based resources 702 include a database configured to store information concerning one or more of the status, location and health of the portable power chargers 704A, 704B, 704C.

Depending on the embodiment, the portable power chargers 704A, 704B, 704C include one or more of an AC charging outlet 730, at least one USB charging outlet 732 and an inductive charger 734. For example, according to one embodiment, the portable power chargers 704A, 704B, 704C include the AC charging outlet 730 and the at least one USB charging outlet 732 but do not include the inductive charger 734. Other combinations of the charging outlet 730, the at least one USB charging outlet 732 and the inductive charger 734 can be employed together or in combination with other types of charging outputs suitable for charging end-user mobile devices.

The voltage provided at the AC charging outlet 730 can vary depending on the embodiment. In one embodiment, the AC charging outlet 730 provides a 120 VAC, for example, as found at residential wall outlets in the U.S. In another embodiment, the AC charging outlet 730 provides 220 VAC, for example, as found at residential wall outlets in Europe. The preceding voltages are nominal voltage such that the actual voltage provided by the AC charging outlet 730 can vary slightly about the rated output level depending, for example, on the regulation of the output and the load placed on the output.

According to some embodiments, each of the portable power chargers 704A, 704B, 704C includes a wireless communication device, for example, a BLUETOOTH device or a BLUETOOTH low energy device that allows wireless communication between the chargers and the monitoring device 708. The wireless communication is also employed for wireless communication between the portable power chargers 704A, 704B, 704C and the client device 710.

According to one embodiment, the portable power chargers 704A, 704B, 704C are docked in an enclosure 740 when they are not being employed by an end user. The enclosure 740 includes a plurality of bays 742 where each bay 742 is configured to receive one of the portable power chargers 704A, 704B, 704C. According to a further embodiment, each bay 742 includes a first connector configured to receive a second connector located in the housing of each portable power charger 704A, 704B, 704C. In some embodiments, the plug includes both power and communication conductors. In one embodiment, the first connector and the second connector are configured as a male plug and a female receptacle, respectively. According to another embodiment, communication with the portable power chargers 704A, 704B, 704C is provided using wireless communication. In a version of this embodiment, the connector includes only power conductors and does not include communication conductors.

According to one embodiment, the power conductors are connected to a source of AC charging power employed to charge any of the plurality of power chargers 704A, 704B, 704C that are docked in one of the bays 742. For example, the source of AC charging power can be provided from a wall outlet rated at 120 VAC or 220 VAC. Where hardwired communication is employed, the communication conductors are connected to the monitoring device 708 and also to any of the plurality of power chargers 704A, 704B, 704C that are docked in one of the bays 742. The communication connection to the plurality of power chargers 704A, 704B, 704C when docked provides the monitoring device 708 with information concerning the status of the connected portable power chargers. According to an alternate embodiment, the status information is wirelessly communicated According to one embodiment, the status information is wirelessly communicated from the monitoring device 708 to the cloud-based resources 702.

Each of the portable power chargers 704A, 704B, 704C includes an internal battery and power conversion circuitry. Depending on the embodiment, the power conversion circuitry can include any one of, all of or a combination of two or more of: circuitry to convert an AC input to DC to charge the internal battery; circuitry to convert the battery power to an AC output supplied to the AC charging outlet 730; power conversion circuitry to condition the battery power for distribution via the at least one USB charging outlet 732; and power conversion circuitry to condition the battery power for supply to the inductive charger 734. In some embodiments, each of the portable power chargers 704A, 704B, 704C include the AC charging outlet 730, the at least one USB charging outlet 732 and the inductive charger 734 configured as shown and described with reference to the portable charger 206 illustrated in FIG. 2. Thus, in some embodiments, the source of power available at the AC charging outlet 730 is a high-current AC power; the at least one USB charging outlet 732 includes a conventional USB port rated at 5 VDC up to 3 Amps and a "quickcharge" USB port, for example, Qualcomm® Quick Charge® technology; and the inductive charger 734 includes a coil employed to generate and wirelessly transmit a high frequency AC power signal.

The access device 706 is operated by the system operator to monitor and manage the portable power chargers 704A, 704B, 704C. The functionality can provide the system operator with information including usage statistics, a projected life of the internal battery included in a portable power charger 704A, 704B, 704C, a current charge status of the internal battery and a location of the portable power chargers 704A, 704B, 704C. Depending on the embodiment, the access device 706 can include any of a desktop computer or a portable device such as a tablet computer, a hand-held computer, a personal digital assistant, an e-reader, a mobile telephone, a smart phone, a laptop computer, or a combination of any two or more of these processing devices and/or other processing devices provided that the access device 706 gives the system operator access to the cloud-based resources 702, a display and navigation tools to allow the system operator to utilize the resources 702. According to further embodiments, the system 700 also allows the system operator to control elements of system via the cloud-based resources 702. For example, the system administrator can set various types and amounts of collateral required to activate the portable power chargers 704A, 704B, 704C, and/or deactivate user accounts to prevent access by unauthorized users.

In one embodiment, the monitoring device 708 is a tablet computer. However, depending on the embodiment, the monitoring device 708 can be, for example any type of processing device suitable for remote communication such as a desktop computer, a tablet computer, a hand-held computer, a personal digital assistant, an e-reader, a mobile telephone, a camera, a smart phone, a laptop computer, or a combination of any two or more of these processing devices and/or other processing devices. In further embodiments, the monitoring device 708 is included as a part of the enclosure 740. For example, the monitoring device 708 can be an embedded computer included in the enclosure 740. In one embodiment, the monitoring device 708 can wirelessly communicate with the portable power chargers 704A, 704B, 704C that are within range of the wireless communication device employed for communication between the monitoring device and chargers, for example, BLUETOOTH or Wi-Fi.

In one embodiment, the client device 710 is a mobile phone. However, depending on the embodiment, the client device 710 can be, for example any of a portable device such as a tablet computer, a hand-held computer, a personal digital assistant, an e-reader, a mobile telephone, a smart phone, a media player, a navigation device, an e-mail device, a game console, a laptop computer, or a combination of any two or more of these processing devices and/or other processing devices provided that the client device 710 can operate to communicate with the cloud-based resources 702 to allow the user to provide their identity and collateral and to receive an authorization to activate a portable power charger 704A, 704B, 704C.

Depending on the embodiment, the communication networks 712, 714, 716, 718 can include any of local-area networks (LANs), wide area networks (WANs), wireless communication, wired communication and may include the Internet. According to further embodiments, the communication networks provides access to one or more remote devices, servers, application resource management and/or data storage systems either alone or in combination with the cloud-based resources 702. Communication in the system 700 can occur using any of Wi-Fi networks, Bluetooth communication, cellular networks, satellite communication, Ethernet and peer-to-peer networks. Other communication protocols and topologies can also be implemented as a part of the communication networks 712, 714, 716, 718 in accordance with various embodiments. The communication networks 712, 714, 716, 718 can be any network topology as known to those of ordinary skill in the art capable of supporting the operations described herein.

According to the illustrated embodiment, the access device 706 connects to the cloud-based resources 702 via the first communication network 712 the monitoring device 708 connects to the cloud-based resources via the second communication network 714, the client device 710 connects to the cloud-based resources via the third communication network 716 and the monitoring device connects to the enclosure 740 via the fourth communication network 718.

According to one embodiment, the enclosure 740 does not include any communication. According to this embodiment, the fourth communication network is employed for communication directly between the monitoring device 708 and the portable power chargers 704A, 704B, 704C. The communication networks 712, 714, 716, 718 can include one or more segments that are common to one another. As one example, the second communication network 714 and the third communication network 716 may include a common Wi-Fi network that operates in the vicinity of the enclosure 740. In other embodiments, network segments are distinct from one another. For example, the fourth communication network 718 can include a communication connection provided between the monitoring device 708 and each of the portable power chargers 704B, 704C that are in the proximity of the enclosure 740.

According to one embodiment, the user management module 720 is employed to receive and approve identification information provided by end users, for example, when an end user creates an account by providing a user name and password. The user management module 720 can also be employed to store payment or other account information that is employed to provide collateral for the end user to activate one of the portable power chargers 704A, 704B, 704C.

According to one embodiment, the device activation module 722 is employed to process activation requests received when an end user removes the portable power charger 704A from the enclosure 740 to activate the charger for use. Depending on the embodiment, the activation request can include information that uniquely identifies the user, information that uniquely identifies the charger and, where required, collateral provided by the user. In one embodiment, the device activation module 722 also generates a device activation signal if the user request is approved. In a further embodiment, the device activation module 722 also communicates messaging to the end user, for example, indicating an approval or denial of a request to activate the portable power charger 704A.

According to one embodiment, the system monitoring and management module 724 is employed to provide the system operator with information concerning one or more of the status, location and health of the portable power chargers 704A, 704B, 704C. In one embodiment, the system monitoring and management module provides an indication of whether each of the portable chargers is docked in the enclosure, or alternative has been removed by a user. Further embodiments provide information including one or more of usage statistics, a projected life of the internal battery and a current charge status of the internal battery.

In operation and according to one embodiment, the system operator deploys the portable power chargers 704A, 704B, 704C on-site in the enclosure 740. The enclosure 740 is connected to a source of AC and monitoring is activated via the monitoring device 708 and cloud-based resources 702. The monitoring device 708 wirelessly communicates with each of the portable power chargers 704A, 704B, 704C, for example, to obtain status information. Depending on the embodiment in addition to the types of status information described in the preceding paragraph, status information can include any one of the following types of information, any combination of the following or any combination of the following and other types of information: battery characteristics such as the nominal battery voltage, the battery input current when the battery is being charged, and the battery output voltage when supplying current to a user device; and any of the types of status information described in the preceding paragraph.

Information communicated from the monitoring device 708 to the cloud-based resources is stored for access by the system operator 706. The system operator establishes conditions by which end users can activate the portable power chargers 704A, 704B, 704C for use, for example, whether and what type of collateral is required for use. In one embodiment, a payment is required in advance. According to another embodiment, an authenticated user identity alone is sufficient, for example, where a university providers chargers to students as a courtesy.

A user removes a charger 704A from the enclosure 740 and locates information on the charger's housing that uniquely identifies the charger. The user employs the client device 710 to communicate their identity along with the identity of the charger to the cloud-based resources 702. Where the user is approved, a device activation signal is communicated from the cloud-resources 702 to the client device 710. The client device 710 communicates the device activation signal to the charger that was identified in their request. The charging power outputs 730, 732 and 734 are activated for use. The end user operates the portable power charger to employ the desired charging power outlet best suited to their device. When the charging process is completed, the portable power charger 704A is returned to the enclosure and communicates that status change to the system monitoring and management module 724. The end user is then released from responsibility for the chargers return. The monitoring device 708 detects the return of the portable power charger 704A. The system operator is able to monitor whether and which of the chargers 704A, 704B, 704C are docked in the enclosure 740 at any time. Thus, the system operator is aware should the user fail to return a charger following use.

While the enclosure 740 is illustrated and described in an embodiment in which the plurality of portable power chargers 704A, 704B, 704C are housed therein other approaches can be employed in various alternate embodiments. For example, the plurality of portable power chargers 704A, 704B, 704C can be received in other forms of docking station provided that, when stored or docked, the chargers receive power to recharge their internal batteries, respectively. According to one embodiment, inductive charging is employed to recharge the portable power chargers 704A, 704B, 704C, for example, in a manner shown and described above with reference to FIGS. 1-6.

Embodiments of the apparatus, methods and systems described herein can be employed to provide distributed AC power in new or existing facilities.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for remote monitoring and management of chargers providing an AC output in a portable, hand-held form factor, the monitoring and management functionality accessible to a system operator over a wide area network, the system comprising:

a plurality of portable chargers each including an internal battery, a first charging output coupled to the internal battery and configured to provide AC charging power and at least one additional charging output coupled to the internal battery, the at least one additional charging output including at least one of: an inductive charger and a plug-in DC charger; and an enclosure coupled to a source of AC power suitable for recharging the plurality of portable chargers, the enclosure including a plurality of bays each configured to receive one of the plurality of portable chargers, respectively, each of the plurality of bays including an electrical connection configured to couple to the internal battery of the respective portable charger to provide power to recharge the internal battery; and resources accessible to the system operator over the wide area network to allow the system operator to monitor and manage an operation of the plurality of portable chargers, the resources including:

a device activation module configured to permit users to activate a charger selected from the plurality of portable chargers following a receipt of collateral provided by the user via a client device, the device activation resulting in charging power being made available at each of the first charging output and the at least one additional charging output; and a system monitoring module configured to provide the system operator with information concerning an operational status of each of the plurality of portable chargers, the operational status including at least one of: usage statistics, a projected life of the internal battery, and a current charge status of the internal battery.

2. The system of claim 1, wherein the client device is a first wireless communication device configured to wirelessly couple to the resources.

3. The system of claim 2, further comprising a second wireless communication device configured to wirelessly couple to the plurality of portable chargers, wherein the second wireless communication device is configured to wirelessly communicate the information concerning the operational status to the system monitoring module.

4. The system of claim 3, wherein the device activation module is configured to communicate a device activation signal to the client device, and wherein the charger selected from the plurality of chargers is configured to provide power at the first charging output and at the at least one additional charging output when the device activation signal is received from the client device.

5. The system of claim 4, wherein the device activation module is configured to maintain the charger selected from the plurality of chargers in an off-state pending an acceptance of the collateral provided by the user.

6. The system of claim 5, wherein the device activation module is configurable by the system operator to accept collateral of a pre-determined type selected by the system operator.

7. The system of claim 6, wherein the pre-determined type of collateral includes at least one of: a monetary payment; an interaction by the user with content hosted on the resources and delivered to the client device; an authenticated identity of the user; and payment-account information of the user.

8. The system of claim 1, wherein the resources include a user management module configured to allow each of a plurality of users to establish an account to uniquely identity the user, respectively, and wherein the user management module is accessible to the system operator to establish one or more permissions for each of the plurality of users, the permissions established by the system operator based on conditions including at least one of: acceptance of a user identity; an identification of a geographic location of the plurality of portable chargers accessible to the respective user; and a venue accessible to the respective user.

9. The system of claim 1, wherein the first charging output is configured to provide 120 VAC charging power rated at 75 Watts or greater.

10. A method of remotely monitoring and managing, over a wide area network, an operation and deployment of a plurality of portable chargers each including an internal battery, each of the plurality of portable chargers providing an AC output in a hand-held form factor, the monitoring and managing provided by a system operator, the method comprising:

including a device activation module and a system monitoring module in resources accessible to the system operator over the wide area network;

processing collateral received by the resources from a client device possessed by a user interested in activating an AC output included in a charger selected by the user from the plurality of portable chargers; and if the collateral is accepted:

wirelessly communicating an authorization from the device activation module to the client device;

receiving, by the charger selected by the user, a device activation signal wirelessly communicated from the client device following a receipt of the authorization;

activating the AC output included in the charger selected by the user following a receipt of the device activation signal;

coupling each of the plurality of portable chargers to a wireless communication device when the plurality of chargers are deployed; and receiving, by the system monitoring module, information communicated wirelessly from the wireless communication device the information concerning an operational status of each of the plurality of portable chargers, the operational status including at least one of: usage statistics, a projected life of the internal battery, and a current charge status of the internal battery.

11. The method of claim 10, wherein the client device is a first wireless communication device, wherein the method further comprises:

providing a second wireless communication device configured to wirelessly couple to the plurality of portable chargers; and wirelessly communicating the information concerning the operational status to the system monitoring module via the second wireless device.

12. The method of claim 11, further comprising maintaining the charger selected by the user in an off-state pending an acceptance of the collateral provided by the user.

13. The method of claim 12, further comprising configuring the device activation module to accept collateral of a pre-determined type selected by the system operator.

14. The method of claim 13, further comprising accepting collateral including at least one of: a monetary payment; an interaction by the user with content hosted on the resources and delivered to the client device; an authenticated identity of the user; and payment-account information of the user.

15. The method of claim 10, further comprising:

including a user management module in the resources accessible to the system operator over the wide area network, the user management module configured to allow each of a plurality of users to establish an account to uniquely identity the user, respectively, and establishing one or more permissions for each of the plurality of users, the permissions established by the system operator based on conditions including at least one of: acceptance of a user identity; an identification of a geographic location of the plurality of portable chargers accessible to the respective user; and a venue accessible to the respective user.

16. The method of claim 10, further comprising configuring the AC output to provide 120 VAC charging power rated at 75 Watts or greater.

17. A system for remote monitoring and management of chargers providing an AC output in a portable, hand-held form factor, the monitoring and management functionality accessible to a system operator over a wide area network, the system comprising:
- a plurality of portable chargers each including an internal battery, a first charging output coupled to the internal battery and configured to provide AC charging power and at least one additional charging output coupled to the internal battery, the at least one additional charging output including at least one of: an inductive charger and a plug-in DC charger; and
- resources accessible to the system operator over the wide area network to allow the system operator to monitor and manage an operation of the plurality of portable chargers, the resources including:
  - a device activation module configured to permit users to activate a charger selected from the plurality of portable chargers following a receipt of collateral provided by the user via a client device, the device activation resulting in charging power being made available at each of the first charging output and the at least one additional charging output; and
  - a system monitoring module configured to provide the system operator with information concerning an operational status of each of the plurality of portable chargers, the operational status including at least one of: usage statistics, a projected life of the internal battery, and a current charge status of the internal battery.

18. The system of claim 17, wherein the client device is a first wireless communication device, wherein the system further comprises a second wireless communication device configured to wirelessly couple to the plurality of portable chargers, and wherein the second wireless communication device is configured to wirelessly communicate the information concerning the operational status to the system monitoring module.

19. The system of claim 17, wherein the device activation module is configurable by the system operator to accept collateral of a pre-determined type selected by the system operator.

20. The system of claim 19, wherein the pre-determined type of collateral includes at least one of: a monetary payment; an interaction by the user with content hosted on the resources and delivered to the client device; an authenticated identity of the user; and payment-account information of the user.

* * * * *